Nov. 22, 1966  J. F. INGLE  3,287,651
ELECTRIC METERING CIRCUIT
Filed March 10, 1964  2 Sheets-Sheet 1

INVENTOR
J. F. INGLE
BY
ATTORNEY

United States Patent Office 3,287,651
Patented Nov. 22, 1966

3,287,651
ELECTRIC METERING CIRCUIT
James F. Ingle, New Providence, N.J., assignor to Bell Telephone Laboratories, Incorporated, New York, N.Y., a corporation of New York
Filed Mar. 10, 1964, Ser. No. 350,807
1 Claim. (Cl. 328—150)

This invention relates to electric meter circuits and in particular to such circuits which render meter indications substantially independent of the impedance characteristics of rectifying elements contained in the circuits.

In meter circuits using diodes, variations in meter indications may occur because of changes in the forward impedances of the diodes. (By forward impedance it is meant the impedance of the diode while conducting.) Diode forward impedance changes may occur, for example, because of temperature and humidity changes and, furthermore, because of the basic nonlinear characteristics of the diodes. As such variations are often undesirable, various attempts have been made to overcome this problem.

One solution to the above-described problem is disclosed in Wurmser Patent No. 2,147,729. The Wurmser patent discloses a feedback amplifier meter circuit in which a meter and diodes are contained in the feedback path. By placing the diodes in the feedback path, signals applied to the meter are substantially independent of the diode forward impedances because of the forcing or correcting action of the feedback path on the amplifier. Because the signals applied to the meter are substantially independent of the diode forward impedances, the meter indications are, therefore, susbtantially independent of changes in these impedances.

In order to obtain the impedance eliminating effect produced by the feedback amplifier used in the Wurmser circuit, it is necessary that the feedback path be conductive for substantially all of each cycle of the signal to be measured. Because the feedback signals must pass through both the diodes and the meter, the circuit is limited to making measurements requiring conduction during substantially all of each cycle; that is, it cannot be used for making measurements where diode conduction occurs during only a portion of each cycle. It is frequently desirable, if not necessary, to be able to make measurements of the latter type. Peak and quasi R.M.S. measurements, for example, require diode conduction during only a portion of each cycle.

Circuits that overcome the above-described limitation of the Wurmser circuit are disclosed in Miller Patent No. 3,112,449. In the Miller circuits, diodes are connected in feedback paths while meter or load circuits are connected to amplifier output circuits. In one of the Miller circuits, a full-wave rectified output is produced through the use of an additional amplifier, while in another circuit such an output is obtained through the use of a centertapped transformer.

An object of the present invention is to measure the peak, quasi R.M.S., and average values of signals in a manner whereby the indications thus produced are substantially independent of the forward impedances of rectifying elements contained in the measuring circuitry and, furthermore, a transformer or an additional amplifier is not required.

In accordance with the invention, a meter and its associated diode are not an integral part of the feedback path of an amplifier, but instead are alternately connected in shunt with two portions of the feedback path so that the forward impedance changes of the diode are compensated by diodes connected in the feedback path. In particular, the feedback path includes a passive network comprising two paths connected in parallel where each path includes at least one diode with all of the diodes in one of the paths poled in one direction and all of the diodes in the other path poled in the opposite direction. A load circuit comprising a meter is connected to the diode terminal more remote from the amplifier input terminal of one of the diodes in each of the parallel paths by a detecting circuit which includes a serially connected diode.

Because of the manner in which the detecting circuit and meter are connected to the feedback path in accordance with the present invention, the replica of the input signal applied to the detecting circuit is displaced to either side of its zero value by an amount equal to the voltage drops across the feedback path diodes when they are conducting; in other words, the positive and negative portions of the replica of the input signal have positive and negative reference potentials, respectively, added to them, which reference potentials are equal to the voltage drops across the feedback path diodes when conducting. This extra voltage introduced by the feedback path diodes substantially compensates for the voltage drop appearing across the detecting circuit diode. Voltage drop changes occurring in the detecting circuit diode because of temperature or humidity changes or the diode's operating characteristics are therefore substantially compensated by similar changes occurring in the feedback path diodes.

Other objects and features of the invention will become apparent from a study of the following detailed description of an embodiment of the invention.

Figure 2:
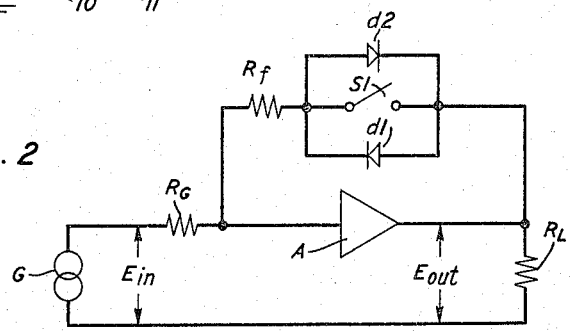
FIG. 2 is a schematic diagram used in explaining the operation of the embodiment depicted by FIG. 1.
Figure 4:
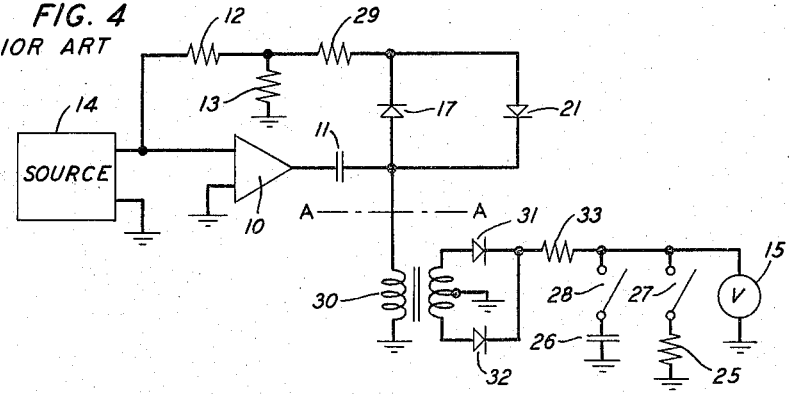
Figure 3A:
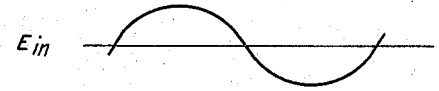
Figure 3B:
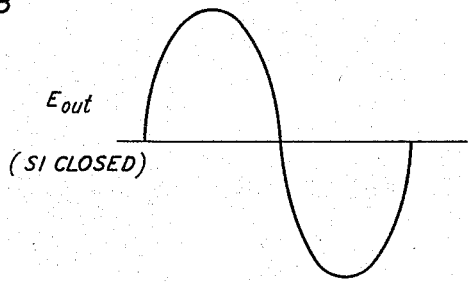
Figure 3C:
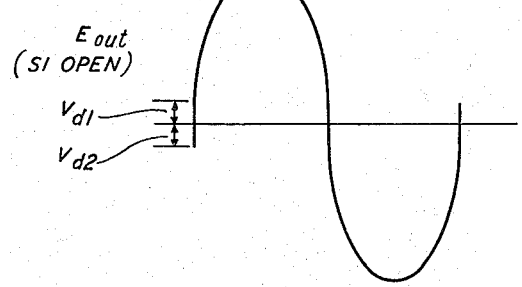

FIGS. 3A through 3C disclose waveforms occurring at specific points in the schematic of FIG. 2 under specified conditions;

FIG. 4 is a schematic diagram of one of the Miller circuits; and

Figure 5:
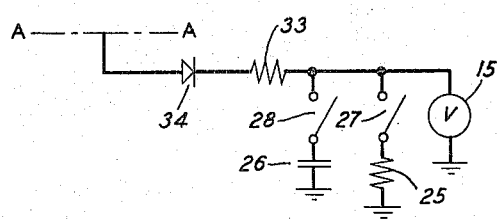

FIG. 5 is a schematic diagram of a half-wave detecting circuit that is used in one of the Miller circuits in place of the one disclosed in FIG. 4.

Figure 1:
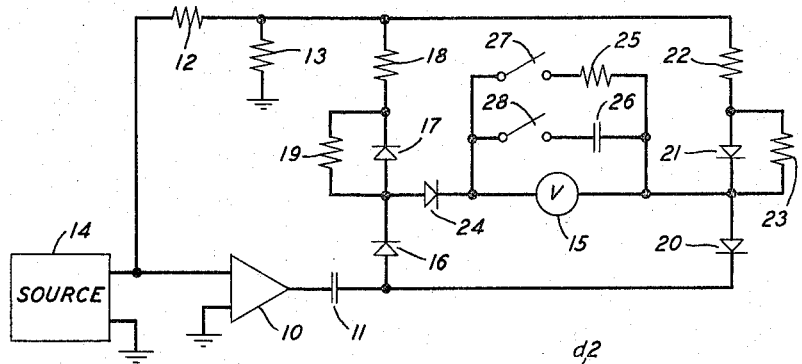
FIG. 1 is a schematic diagram of one embodiment of the invention.

FIG. 1 discloses a schematic diagram of one embodiment of the invention. This embodiment includes an amplifier 10 having a feedback path comprising a capacitor 11, a passive parallel network and a pair of resistors 12 and 13. The output of a source 14, whose voltage amplitude is to be measured, is applied to amplifier 10 while the amplitude of the voltage being measured is indicated on a meter 15 connected to the feedback path.

One branch of the passive parallel network connected in the feedback path includes a pair of diodes 16 and 17 and a resistor 18 connected in series with the diodes poled for easy current flow away from the output of amplifier 10. A resistor 19 is connected in parallel with diode 17. The second branch of the parallel network includes a pair of diodes 20 and 21 and a resistor 22 connected in series with the diodes poled for easy current flow toward the output of amplifier 10. A resistor 23 is connected in parallel with diode 21.

A detecting circuit and meter 15 are connected between the junction of diodes 16 and 17 and the junction of diodes 20 and 21. In particular, the anode of a diode 24 is connected to the junction between diodes 16 and 17 while the cathode of diode 24 is connected to meter 15, which in turn is connected to the junction between diodes 20 and 21. A resistor 25 and a capacitor 26 are connected in parallel with meter 15 by closing switches 27 and 28, respectively. As will become apparent shortly, meter 15 produces an average voltage indication with switches 27 and 28 open, a peak voltage indication with switch 27 open and switch 28 closed and a quasi R.M.S. voltage indication with both switches closed.

The operation of the embodiment disclosed in FIG. 1 may be better understood by first referring to the schematic diagram shown in FIG. 2. The schematic diagram of FIG. 2 includes an amplifier A having a feedback path comprising a resistor $R_f$ connected in series with a passive parallel network. The parallel network includes a pair of diodes $d1$ and $d2$ and a switch S1 connected in three parallel branches, respectively. The diodes are oppositely poled with respect to one another. Switch S1, when closed, removes the effect of the diodes in the feedback path. A load $R_L$ is connected across the output of amplifier A while a source G having an internal resistance $R_G$ is connected to the input of the amplifier. The voltage from source G is identified as $E_{in}$ while that appearing across load $R_L$ is identified as $E_{out}$.

In the circuit of FIG. 2, the gain of amplifier A is relatively large and the values of resistors $R_f$ and $R_L$ are relatively large compared to the value of the resistor $R_G$. With switch S1 closed, it may readily be demonstrated by one skilled in the art that the voltage $E_{out}$ is approximately equal to the voltage $E_{in}$ times the value of resistor $R_f$ divided by the value of resistor $R_G$. When the switch S1 is open, the feedback path is open-circuited until voltage $E_{out}$ attains the voltage level necessary for either diodes $d1$ or $d2$ to conduct. During the time the feedback path is open-circuited, all of the input voltage $E_{in}$ is subjected to the gain of amplifier A. The effect of this action is to displace the positive and negative portions of the voltage $E_{out}$ to either side of its zero value by voltages equal to the voltage drops across diodes $d1$ and $d2$ when these diodes are conducting. In other words, voltage $E_{out}$ now equals the voltage drop across the conducting diode plus $E_{in}$ times the value of resistor $R_f$ divided by the value of resistor $R_G$. This may be better appreciated by referring to FIGS. 3A through 3C which are arranged above one another in time alignment.

FIG. 3A shows the waveform of input voltage $E_{in}$. FIG. 3B shows the waveform of output voltage $E_{out}$ when switch S1 is closed while FIG. 3C shows the waveform of output voltage $E_{out}$ when switch S1 is open. It should be noted in FIG. 3C that the positive and negative portions of the waveform of FIG. 3B have been displaced from the zero axis by the diode forward voltage drops $V_{d1}$ and $V_{d2}$, respectively. This displacement occurs substantially instantaneously because of the high gain of the over-all circuit during the time the feedback path is open-circuited.

Diodes $d1$ and $d2$ of FIG. 2 correspond to diodes 17 and 21, respectively, of FIG. 1. Diodes 16 and 20 of FIG. 1, on the other hand, alternately perform isolating functions. In particular, diode 16 conducts only during the positive portions of the output of amplifier 10 while diode 20 conducts only during the negative portions of the amplifier output. The gain of amplifier 10, as amplifier A of FIG. 2, is relatively large. For an input waveform as shown in FIG. 3A, the waveform appearing at the junction between diodes 16 and 17 is therefore identical to the positive portion of the waveform in FIG. 3C while the waveform appearing at the junction between diodes 20 and 21 is identical to the negative portion of the waveform in FIG. 3C.

With switches 27 and 28 open, current during the positive outputs of amplifier 10 flows from the amplifier through diodes 16 and 17 (virtually no current flows through resistor 19 because of the low impedance of diode 17 when it is conducting), and resistor 18 to the junction between resistors 12 and 13. The majority of current to and from this junction flows through resistor 13 rather than resistor 12 because the value of resistor 13 is much less than that of resistor 12. Current also flows through diode 24, meter 15, resistor 23 (virtually no current flows through diode 21 because it is nonconducting and therefore has a relatively high impedance), and resistor 22 to the junction between resistors 12 and 13. During the negative portions of the output of amplifier 10 current flows from the junction of resistors 12 and 13 through resistor 22, diode 21 (virtually no current flows through resistor 23 because of the low impedance of diode 21 when it is conducting), and diode 20 to amplifier 10. During the negative portion of the output of amplifier 10, current also flows through resistor 18, resistor 19 (virtually no current flows through diode 17 because it is nonconducting and therefore has a relatively high impedance), diode 24, meter 15, and diode 20 to the output of amplifier 10.

Resistors 19 and 23, as believed apparent from the discussion in the previous paragraph, provide current paths for meter 15 when diodes 17 and 21, respectively, are backbiased by the output from amplifier 10.

A forward voltage drop appears across diode 24. This voltage drop, as discussed previously, may vary, for example, as a function of temperature, humidity or current through the diode. Such variations affect the indication produced by meter 15. As discussed in detail below, the effects produced by diodes 17 and 21 in the feedback path substantially eliminate these variations.

As mentioned above, the voltage applied between the junction of diodes 16 and 17 and ground during the positive portion of the output of amplifier 10 has a value illustrated by the positive portion of FIG. 3C. The voltage applied between the junction of diodes 20 and 21 and ground during the negative portion of the amplifier has a value illustrated by the negative portion of FIG. 3C. The voltage applied across the detecting circuit and meter 15 is therefore a replica of the input with a positive voltage equal to the forward voltage drop across diode 17 added to the positive portion and a negative voltage equal to the forward voltage drop across diode 21 added to the negative portion. Through the use of ordinary engineering skills, diodes 17, 21, and 24 are readily selected so that forward voltage drops appearing across diodes 17 and 21 are substantially equal to the forward voltage drop appearing across diode 24. (Diode 24, for example, is subjected to less current than diodes 17 and 21.) It may be found desirable, for example, to let diode 24 take the form of two serially connected diodes where one of the diodes has a relatively small, constant forward voltage drop. The extra potential drop provided by this diode tends to compensate for the difference in forward voltage drops appearing across the diode in series with it and diodes 17 and 21. The feedback amplifier and diodes 17 and 21 located in the feedback path, therefore, cooperate to cause the half wave voltages applied to the detector circuit to be increased by fixed amounts sufficient to substantially compensate for the forward voltage drop appearing across the detector circuit diode.

With switches 27 and 28 open, current flows through diode 24 throughout substantially all of each cycle of the input voltage waveform. Under these conditions of operation, meter 15 produces an indication which is representative of the average of the input voltage. When switch 28 is closed, capacitor 26 is connected across meter 15 and is charged during portions of each cycle. Because the circuit tends to maintain a full charge on capacitor 26, a current is forced through meter 15 to produce an indication representative of the peak value of the input voltage. Why these indications are representative of the average and peak values of the input voltages are well recognized by those skilled in the art.

When switches 27 and 28 are both closed, meter 15 produces an indication which is indicative of the quasi R.M.S. value of the input voltage. This is achieved through the selection of the values of resistor 25 and the resistance of the effective source for the detecting circuit. For example, the ratio of the value of resistor 25 to the sum of the values of resistor 25 and the effective source is approximately equal to eight-tenths for the quasi R.M.S. measurement of sine wave signals and white noise signals.

In an embodiment built in accordance with the schematic diagram of FIG. 1, for example, the following values of resistances were used to produce an eight-tenths ratio:

| | Ohms |
|---|---|
| Resistor 25 | 42,000 |
| Resistors 18, 22 | 1,700 |
| Resistors 19, 21 | 7,500 |
| Resistor 13 | 100 |
| Output impedance of amplifier 10 | 26,000 |

FIG. 4 illustrates one of the Miller circuits. This circuit includes an amplifier 10, a pair of diodes 17 and 21, a pair of capacitors 11 and 26, three resistors 12, 13, and 25, a source 14, a meter 15, and a pair of switches 27 and 28, which are substantially identical to and perform substantially identical functions as similarly identified elements in the embodiment depicted by FIG. 1. Resistors 18 and 22 of FIG. 1 have been combined in resistor 29 which is in series connection in the feedback path.

The detector circuit in FIG. 4 is connected between ground potential and the junction of capacitor 11 and diodes 17 and 21 by way of a conventional full wave rectifier circuit comprising a transformer 30 and diodes 31 and 32. The output of the rectifier circuit is applied to the detector circuit by way of a serially connected resistor 33. The waveform of the voltage applied to the rectifier circuit is the same as shown in FIG. 3C. The turns ratio of the transformer is selected so that the forward voltage drops added by diodes 17 and 21 compensate for the forward voltage drops across diodes 31 and 32. A one-to-one turns ratio between the primary and either half of the secondary winding may be acceptable, for example, when diodes 17, 21, 31, and 32 are all of the same type. The values of resistors 25 and 33 are chosen so that the ratio of the value of resistor 25 to the sum of the values of resistors 25 and 33 is substantially equal to eight-tenths. Meter 15 produces indications representative of average, peak and quasi R.M.S. values of the input voltage depending upon the positions of switches 27 and 28 as explained with respect to FIG. 1.

FIG. 5 is a schematic diagram of a detector circuit that may be used in place of the one shown below line A—A in FIG. 4 when the indications produced by half wave rectification are acceptable. The only difference between this detector circuit and the one disclosed in FIG. 4 is that transformer 30 and diodes 31 and 32 have been replaced by a diode 34.

While the invention has been described with respect to only one embodiment, it will be evident to those skilled in the art that various modifications may be made without departing from the spirit and scope of the invention.

What is claimed is:

In combination
an amplifier having an input terminal and an output terminal,
a negative feedback path connected between said amplifier input and output terminals,
said feedback path including a serially connected passive network comprising two paths connected in parallel where each path comprises a first diode, a parallel combination of a second diode and a first resistor, and a second resistor all connected in series in the stated order beginning at the end of the path closer to said amplifier output and, furthermore, where all of said diodes in one of said paths are poled in one direction and all of said diodes in the other path are poled in the opposite direction,
a load circuit, and
means including at least one diode connecting said load circuit between the junctions between said first diode and said parallel combination in each of said parallel paths.

References Cited by the Examiner
UNITED STATES PATENTS

| 3,092,729 | 6/1963 | Cray | 330—110 X |
| 3,112,449 | 11/1963 | Miller | 328—150 X |
| 3,212,003 | 10/1965 | Barrass et al. | 330—110 |

ROY LAKE, *Primary Examiner.*

A. L. BRODY, *Assistant Examiner.*